United States Patent Office 3,230,161
Patented Jan. 18, 1966

3,230,161
PREPARATION OF MERCAPTANS
Harry E. Gunning, Edmonton, Alberta, Canada, assignor to Imperial Oil Limited, a corporation of Canada
No Drawing. Filed Apr. 3, 1963, Ser. No. 270,169
7 Claims. (Cl. 204—162)

The present invention relates to an improved process for preparing mercaptans and to new compositions of matter prepared by this process. More particularly, this invention relates to reacting aliphatic paraffins and cycloparaffins in the gas phase with COS (carbonyl sulfide) in the presence of ultraviolet light at temperatures of 0–200° C. to obtain respectively alkyl mercaptans and cycloalkyl mercaptans. Most particularly, in a preferred embodiment, this invention relates to new compositions of matter, cyclopropyl mercaptan and cyclobutyl mercaptan which are useful as oderants and in reactions in general associated with thioalcohols including preparation of disulfides by gentle oxidation, etc.

Aliphatic paraffins and cycloparaffins suitable for use in the present process are in general any aliphatic paraffins or cycloparaffins capable of being converted to the gas phase without decomposition. Preferred feeds are $C_1$–$C_{12}$ cycloparaffins and mono to tri $C_1$–$C_4$ alkyl substituted $C_3$–$C_6$ cycloparaffins. Examples are butane, isopentane, hexadecane, cyclopentane, cyclooctane, cyclododecane, methyl cyclopentane, etc.

Suitable reaction conditions are: (1) temperatures at which vapor pressure of the hydrocarbon is at least 50 mm., preferably in the range of 0 to 200° C., more preferably 0 to 100° C., e. g. 20° C.,(2) pressures in the range of .01 to 100 atmospheres, preferably .01 to 10 atmospheres, e.g. 1 atmosphere, (3) reaction times in the range of 1 minute to 10 hours, preferably 10 minutes to 1 hour, e.g. 1 hour, (4) mol ratios of aliphatic paraffin or cycloparaffin to COS of 100:1 to 0.5:1, preferably 30:1 to 1:1, e.g. 15:1, (5) light intensities of $10^{12}$ quanta/cm.$^2$/sec.– $10^{20}$ quanta/cm.$^2$/sec. and (6) wave length of radiation of 1600 A. to 2700 A., preferably 2000 A. to 2550 A., e.g. 2290 to 2550 A.

The present invention will be more clearly understood by a consideration of the following laboratory examples.

Example 1

Carbonyl sulfide and cyclopropane, at pressures of 50–300 and 400–1100 mm. respectively were irradiated in a static system, i.e. a cylindrical quartz tube, 100 mm. in length and 45 mm. in outside diameter at 25° C., in the wavelength region 2290–2550 A. by a suitably filtered medium pressure mercury arc. Carbon monoxide, sulfur (formed as a deposit on the walls of the reaction vessel) and cyclopropyl mercaptan are the major products.

At the conclusion of each experiment, of from 10 to 20 hours duration, the CO formed was pumped off from a trap at liquid nitrogen temperature and unreacted COS and propane were removed by distillation of the reaction mixture at —130° C. The remaining fraction, analyzed by G.L.P.C. (gas liquid phase chromatography) using an 8 ft. 15% Silicone 550 (with 2% stearic acid) on Celite column at 25° and flow of 65 cc. H$_2$/min., was found to consist of at least 95% cyclopropyl mercaptan. The remaining 5% was carbon disulfide and a small quantity of unidentified product. All analyses reported below were performed on mercaptan samples trapped from the chromatographic effluent.

The identity of the mercaptan was confirmed by mass spectrometric, infrared and N.M.R. (nuclear magnetic resonance) analyses as follows:

The mass spectrum showed a molecular weight of 74. The major peaks observed, with relative intensities in parenthesis, were: 74 (60.1), 59 (11.9), 47 (21.2), 46 (19.9), 45 (64.5), 41 (100), 39 (56.5), 38 (9.35), 27 (11.8).

A gas phase infrared spectrum (30 mm. substrate in a 7.5 cm. cell) displayed peaks centered at 3100, 3030 cm.$^{-1}$ ($\nu$C—H, cyclopropyl), 2580 cm.$^{-1}$ ($\nu$S—H) 1530, 1290, 1030 and 890 cm.$^{-1}$. The latter two bands are typical of compounds containing the cyclopropyl ring (see L. J. Bellamy, "The Infrared Spectra of Complex Molecules," J. Wiley and Sons, New York, 1954, p. 28). This spectrum is consistent with that expected for cyclopropyl mercaptan.

The nuclear magnetic resonance spectrum of the reaction product was determined in carbon tetrachloride solution using ca. 8 mgs. in 0.6 ml. solvent. The spectrum consisted of four complex multiplets centered on $\eta$ values of: A, 8.05; B, 8.23; C, 9.26; D, 9.53; with the integrated areas being in the ratio 1:1:2:2, within the limits of accuracy dictated by the very small sample size. Spin decoupling experiments demonstrated that peaks B, C, and D are coupled to A. Simultaneous irradiation of peaks C and D collapsed peak A to a broadened doublet of spacing ca. 1.2 c.p.s. Peaks C and D may be assigned to the methylene protons on the cyclopropyl ring, the occurrence of such signals at high field having been observed for cyclopropyl amine and methyl cyclopropylcarboxylate (see Varian Associates, "N.M.R. Spectra Catalog," Palo Alto, California, 1962). Peaks A and B are evidently due to single protons, and since peak B resembles that observed for the methine proton in methyl cyclopropylcarboxylate (see Varian Associates, "N.M.R. Spectra Catalog," Pato Alto, California, 1962), if a similar assignment is made here, peak A is thus presumably due to the mercapto-proton.

The five isomers of cyclopropyl mercaptan were also considered as possible reaction products. The various spectra and other properties of these compounds were determined directly or obtained from published reports and compared with those of the observed reaction product. No evidence could be adduced from these comparisons to suggest that the identity of the product was other than cyclopropyl mercaptan. For one isomer, however, 1-methyl vinyl mercaptan, no information is available, but this possibility may be excluded since such a compound likely does not exist as a stable monomer, and in any event would show characteristic C=C and methyl C—H absorption in the infrared.

An examination of some properties of cyclopropyl mercaptan was carried out. A gas phase ultraviolet spectrum showed that the compound begins to absorb at ca. 2600 A., with a maximum at 2300 A., a stronger absorption setting in at ca. 220 A. The retention time on the Silicone 550 column described above was 10.5 minutes, while the compound eluted in 10.2 minutes on an 8 ft. 20% tricresyl phosphate on Kromat column operating at 25° C. with flow of 60 cc. H$_2$/min. The boiling point (as determined by extrapolation of a vapor pressure curve recorded in the temperature range —37 to +25° C.) was 60.0±1.3° C. The vapor pressure at 25° C. was 175 mm. The compound is a colorless liquid having the characteristic mercaptan odor.

Example 2

Cyclobutane was reacted with COS and irradiation as described in Example 1 and the products of the reaction were separated and recovered also as described in Example 1. Again, the remaining fraction was found to consist of at least 95% cyclobutyl mercaptan. The identity of the mercaptan was confirmed by mass spectrometric analysis, i.e. it was found to have the mass spectrum expected for cyclobutyl mercaptan by analogy with the mass spectrum for cyclopropyl mercaptan. In addition, the G.L.C. retention time corresponded to that expected for cyclobutyl mercaptan. Since cyclobutane has strong paraffinic character the reaction with sulfur atoms (from COS) would be expected to be similar to that expected for a linear paraffin.

*Example 3*

Methane was reacted with COS as described in Example 1 and the reacted product containing carbon and hydrogen was found to be 67% methyl mercaptan, 25% dimethyl disulfide and the remainder dimethyl sulfide.

*Example 4*

Ethane was reacted with COS as described in Example 1 and the reacted product containing carbon and hydrogen was found to be above 90% ethyl mercaptan.

*Example 5*

Propane was reacted with COS as described in Example 1 and the reacted product containing carbon and hydrogen was found to be above 90% propyl mercaptan.

*Example 6*

Isobutane was reacted with COS as described in Example 1 and the reacted product containing carbon and hydrogen was found to be above 90% isobutyl mercaptan.

What is claimed is:

1. A process for preparing mercaptans which comprises reacting a hydrocarbon selected from the group consisting of aliphatic paraffins and cycloparaffins in the gas phase with COS in the presence of radiation in the wave length region of 1600 to 2700 A. and recovering a mercaptan from the reaction products.

2. The process of claim 1 in which the hydrocarbon is cyclopropane.

3. The process of claim 1 in which the hydrocarbon is cyclobutane.

4. The process of claim 1 in which the reaction is carried out at temperatures in the range of 0 to 200° C. and the intensity of radiation is $10^{12}$ to $10^{20}$ quanta/cm.$^2$/second.

5. The process of claim 4 in which the mol ratio of hydrocarbon to COS is 100:1 to 0.5:1 and the reaction is carried out at pressures of 0.01 to 100 atmospheres.

6. The process of claim 1 in which the hydrocarbon is a $C_3$–$C_6$ cycloparaffin.

7. The process of claim 1 in which the hydrocarbon is a $C_1$–$C_4$ alkyl substituted $C_3$–$C_6$ cycloparaffin.

References Cited by the Examiner

Danilova et al.: Chemical Abstracts, vol. 53, page 8084(h), (1959).

CHARLES B. PARKER, *Primary Examiner.*

DANIEL D. HORWITZ, *Examiner.*